United States Patent [19]

Alvarez

[11] Patent Number: 4,480,310

[45] Date of Patent: Oct. 30, 1984

[54] DEAD RECKONING RANGE FINDING DEVICE FOR CART

[76] Inventor: Luis W. Alvarez, 131 Southampton Ave., Berkeley, Calif. 94707

[21] Appl. No.: 396,939

[22] Filed: Jul. 9, 1982

Related U.S. Application Data

[63] Continuation of Ser. No. 154,745, May 30, 1980, abandoned.

[51] Int. Cl.³ ............................................ G06F 15/50
[52] U.S. Cl. .................................... 364/450; 364/444; 364/449; 364/460; 377/17; 340/988
[58] Field of Search ............... 364/444, 449, 450, 460, 364/561; 340/22, 24; 377/9, 17

[56] References Cited

U.S. PATENT DOCUMENTS

| | | | |
|---|---|---|---|
| 3,961,166 | 6/1976 | Stobart | 364/450 |
| 4,053,749 | 10/1977 | Shinoda et al. | 364/561 |
| 4,084,241 | 4/1978 | Tsumura | 364/450 |
| 4,136,394 | 1/1979 | Jones et al. | 364/561 |
| 4,139,889 | 2/1979 | Ingels | 364/460 |
| 4,263,657 | 4/1981 | Oka et al. | 364/561 |

*Primary Examiner*—Errol A. Krass
*Attorney, Agent, or Firm*—Townsend and Townsend

[57] ABSTRACT

A dead reckoning range finding device is disclosed for removably detachable mounting to a cart, such as a golf cart. The golf cart, having more than one wheel, is mechanically monitored as to wheel position of at least two wheels to provide at least two required outputs. The first output is the cart distance traveled; the second output is the radius of curvature of the track of the cart, which gives the change in direction per unit of path length traveled with respect to the bearing of a target, such as a golf hole. As specifically applied to the game of golf, at each tee, initialized parameters of range and direction of hole are input to a dedicated microprocessor. Thereafter, even though travel from the tee to hole occurs along a random path (typically a level as possible route following the random direction to which golf balls can be hit by one or two cart riders) a continuous read-out of range to the hole is provided. This continuous read-out is provided by an essentially continuous integration of the direction of travel, as provided by the radius of curvature of the path as well as the path length. Provision is made for either the manual or memory entry of the initial hole parameters of flag direction and range. Provision is made for displaying length of drive from the tee. Specific embodiments include adaptation of the invention to a self-propelled cart having at least three wheels or to a simplified cart having paired co-axial wheels separated by a fixed distance capable of toting only a golf bag.

6 Claims, 13 Drawing Figures

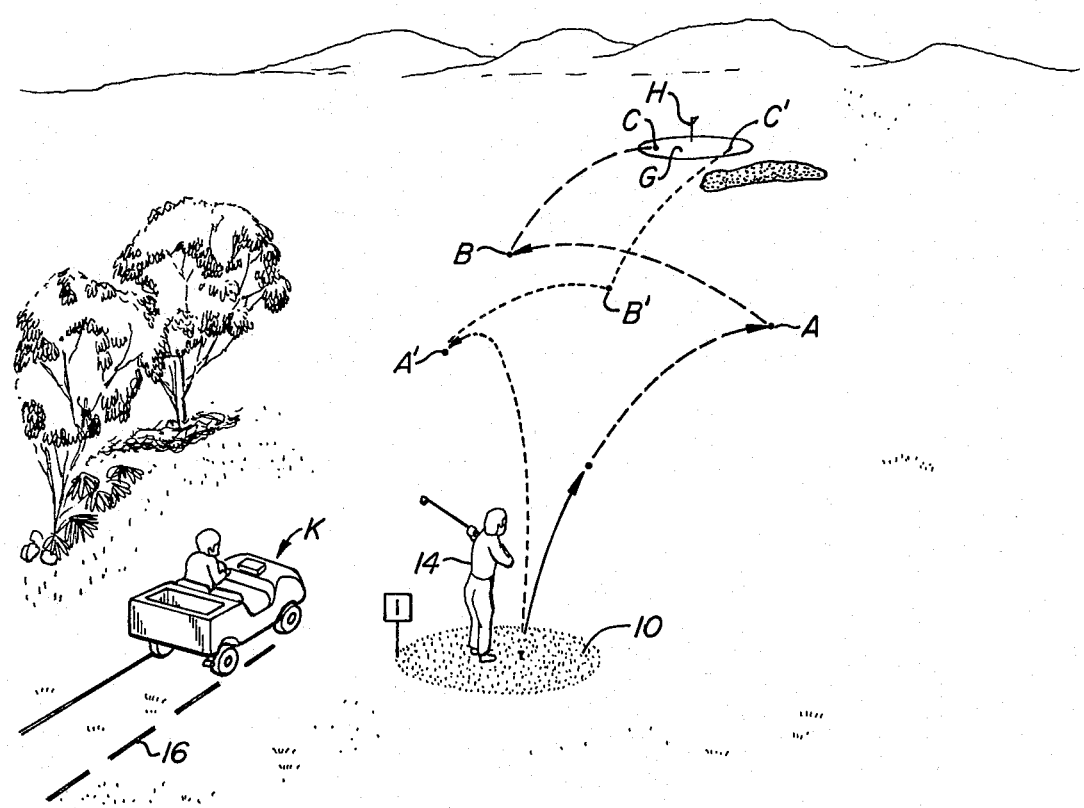
FIG._1A.
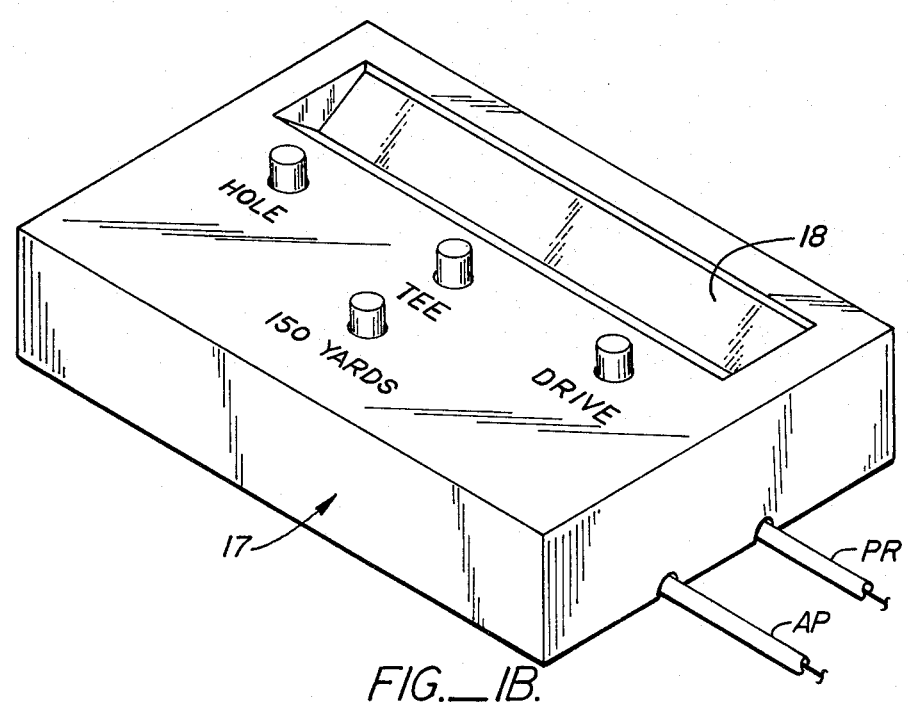
FIG._1B.

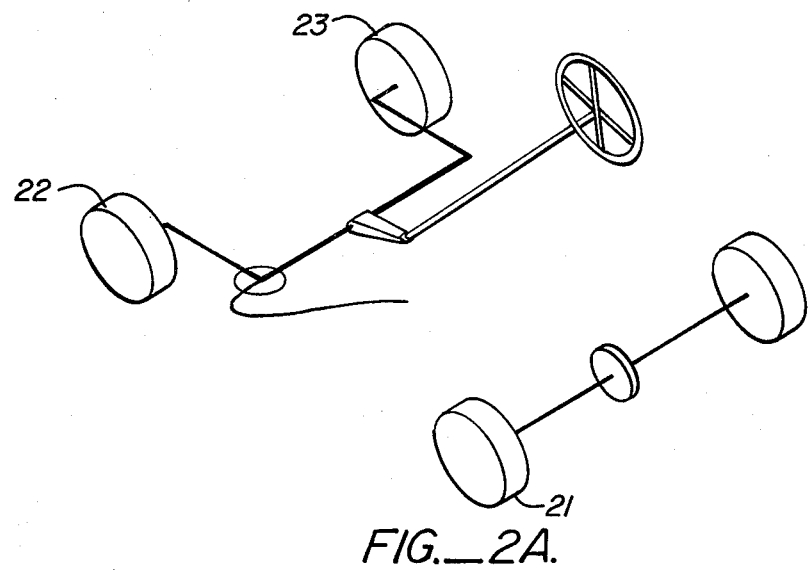
FIG._2A.
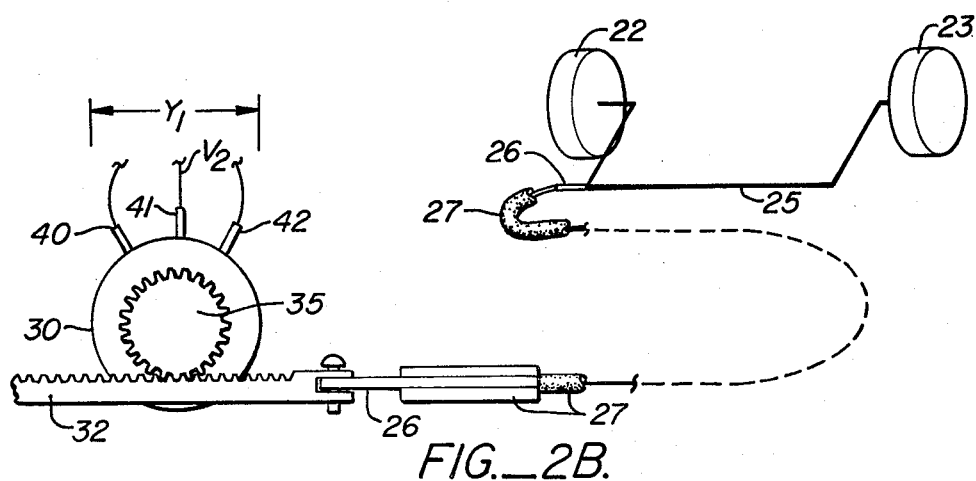
FIG._2B.
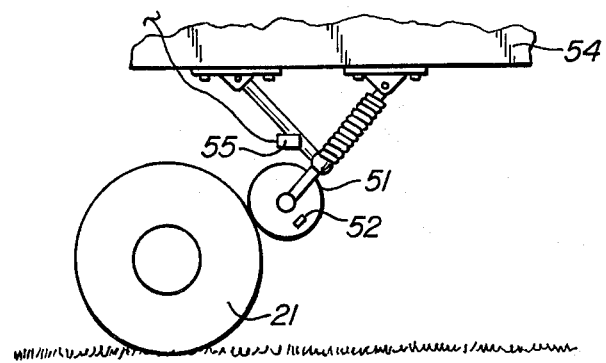
FIG._2C.

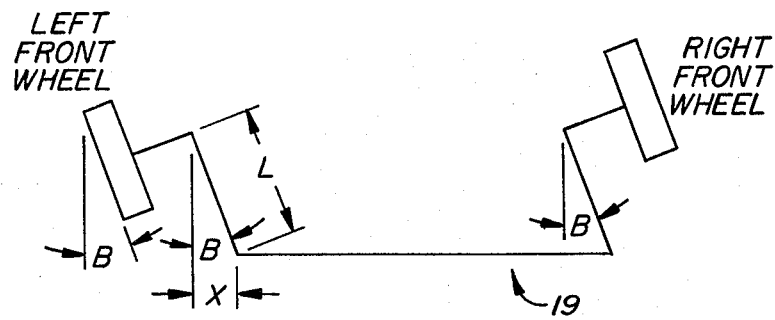
FIG._3.
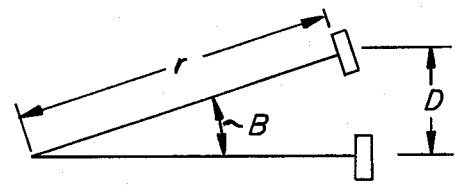
FIG._4.
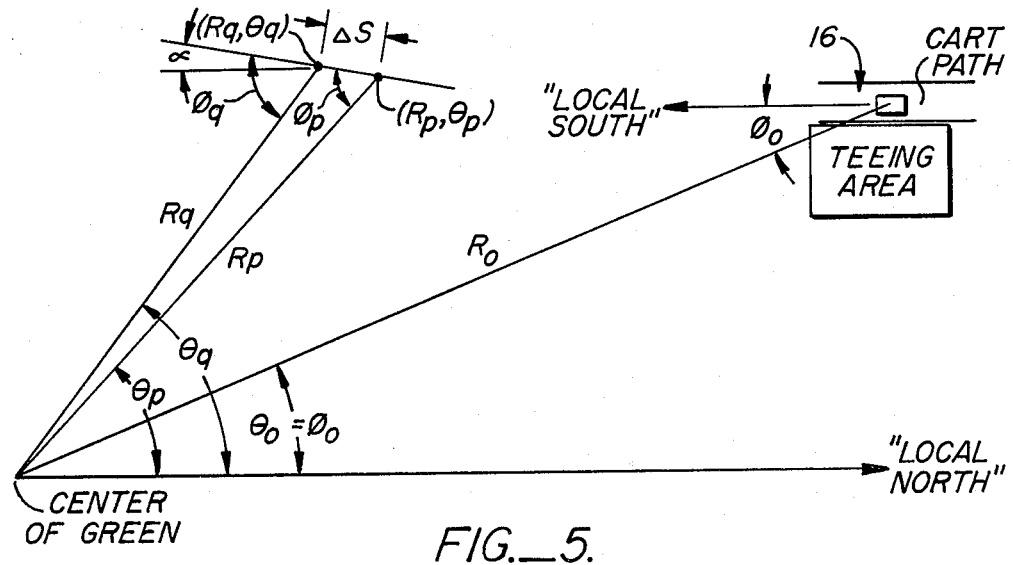
FIG._5.

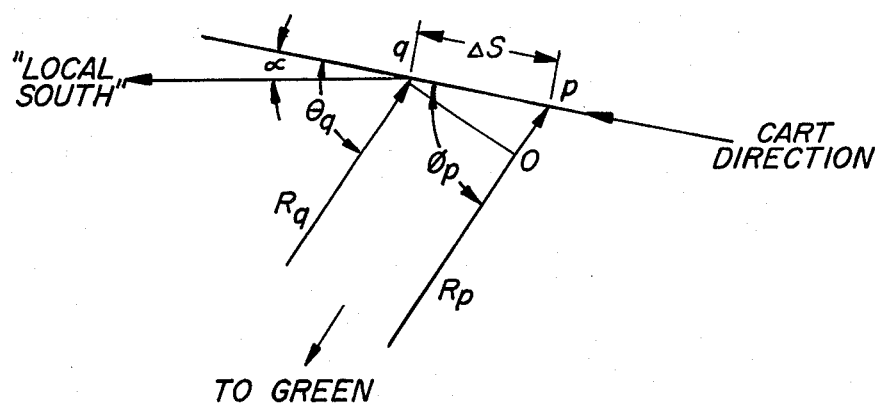
FIG._6.
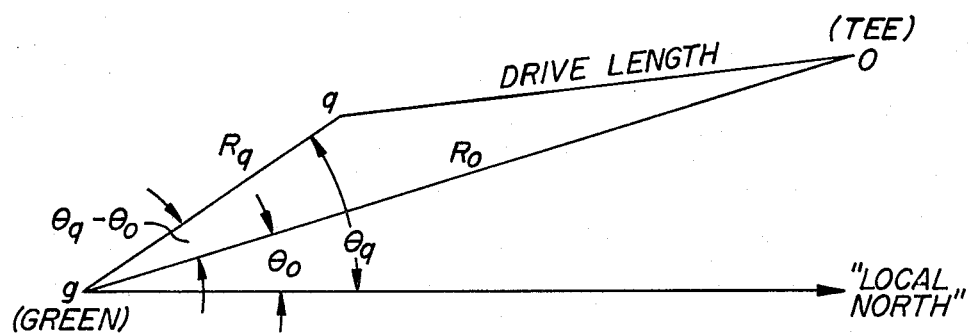
FIG._7.

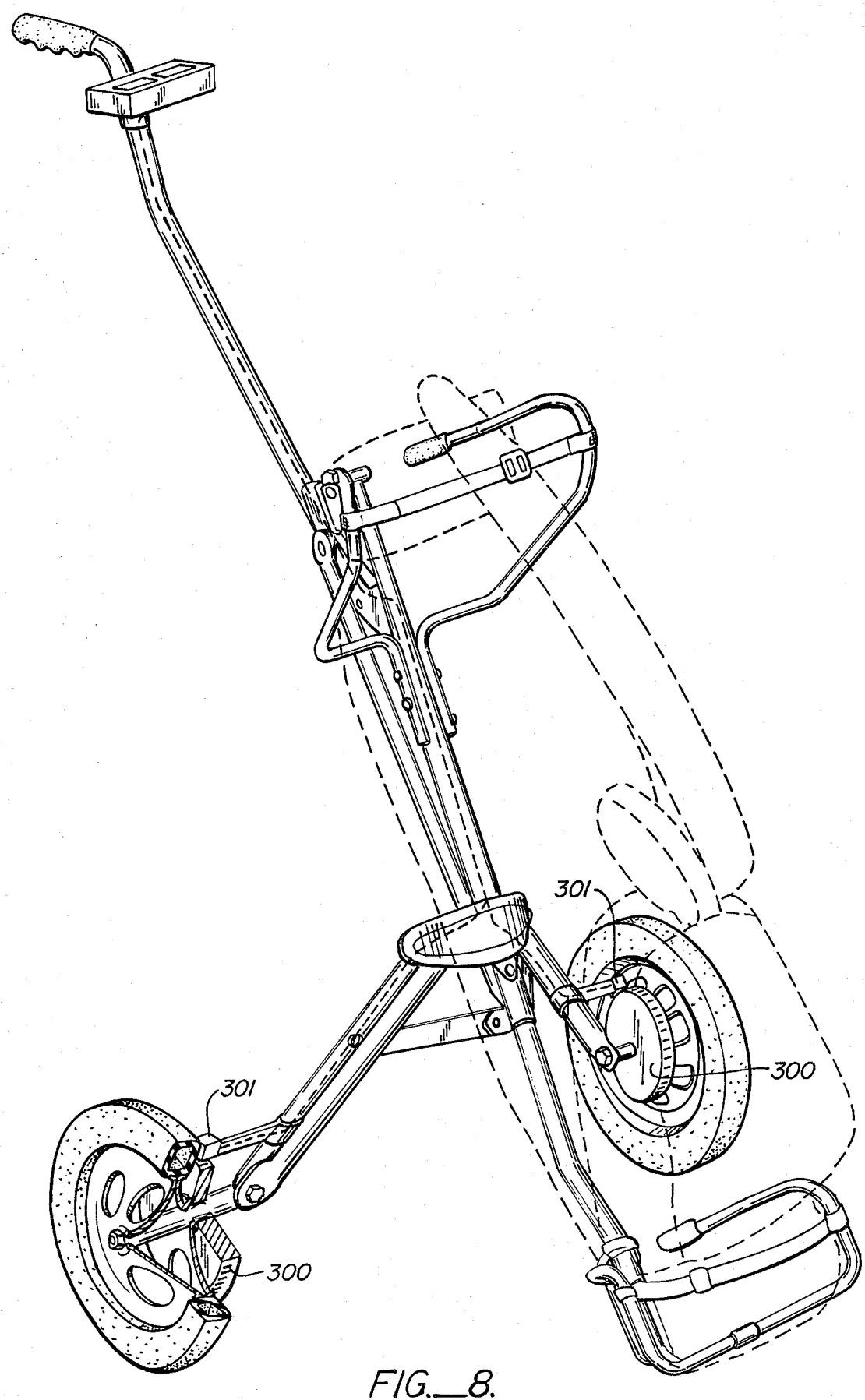
FIG._8.

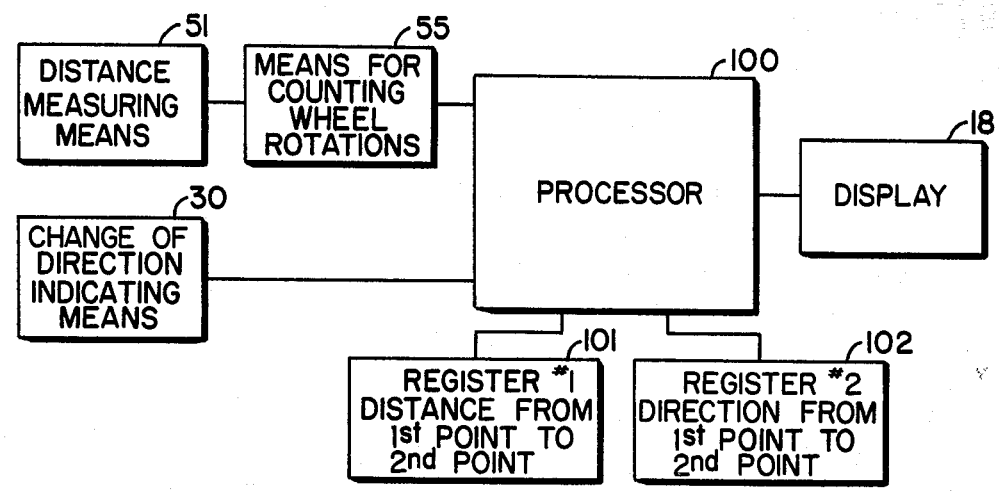
FIG._9.
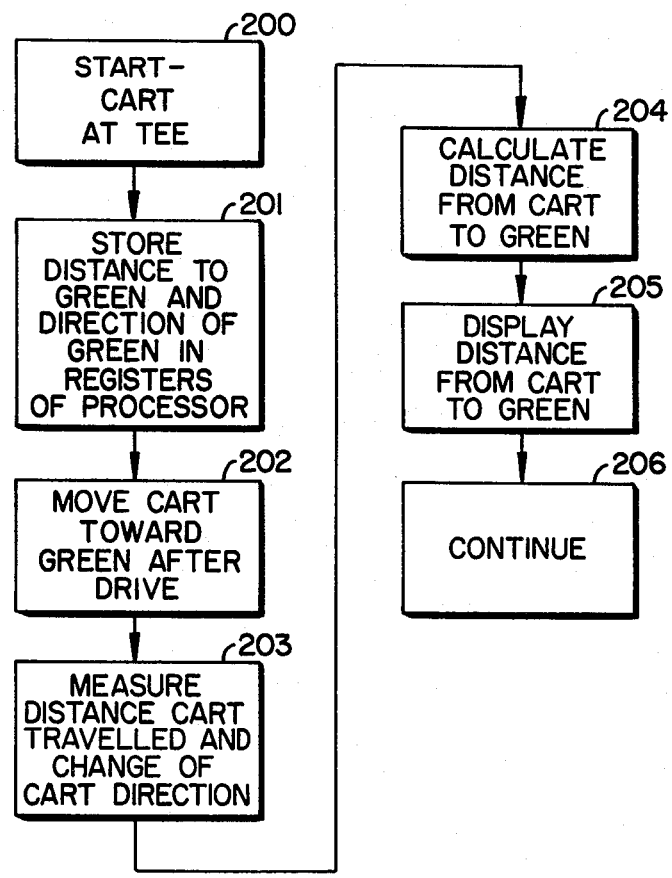
FIG._10.

DEAD RECKONING RANGE FINDING DEVICE FOR CART

This is a continuation of application Ser. No. 154,745, filed May 30, 1980 and now abandoned.

This invention relates to golf and more particularly to a device for continuously reading range to the hole given initial parameters of direction and range of the hole from the tee.

SUMMARY OF THE PRIOR ART

The game of golf requires the players to make estimates of the range to a hole. These estimates are used to select the applicable club. As all golfers know, with proper club selection, hopefully the distance the ball is hit can be controlled within five to ten yard increments.

Distances cannot be accurately measured by the human eye. Accordingly, and for the most proficient of golfers (typically professionals) detailed maps are provided of golf courses indicating range to hole from key landmarks, such as prominent trees, sandtraps, rocks and the like. By reading the map and pacing off the distance to the ball, ranges are typically accurately estimated by the proficient golfer and the ball hit with improved accuracy. This account of golfing practice, in tournaments, is important in showing that there is nothing in the rules of golf that prohibits the golfer from learning and using his exact distance to the green. There is, however, a rule that prohibits the use of optical measuring devices during tournaments, but not during practice rounds.

Use of optical range finders is known. Typically such devices are illegal under the rules of tournament golf and in many cases will not work. Oft times the hole is out of the line of sight from the tee. Moreover, and in order to effect optical range finding, a height of an object, such as the flag at or near the hole, must be known. Often this object is at least partially obscured. Moreover, the delay utilized in optical sighting is unacceptable to golf etiquette.

Conventional odometers for measurement of distance traveled will not work. This is because the golfer usually travels a circuitous path as he follows the ball along a somewhat unpredictable course from the tee to hole.

Conventional dead reckoning tracers (hereinafter DRT's) are not acceptable. Typically, all such devices require at least a constant input of direction as well as distance traveled. Moreover, range to a target only is never the output. Gyro-inputs or magnetic inputs are simply too complex to be applied.

SUMMARY OF THE INVENTION

A dead reckoning range finding device is disclosed for removably detachable mounting to a cart, such as a golf cart. The golf cart, having more than one wheel, is mechanically monitored as to wheel position of at least two wheels to provide at least two required outputs. The first output is the cart distance traveled; the second output is the radius of curvature of the track of the cart, which gives the change in direction per unit of path length traveled with respect to the bearing of a target, such as a golf hole. As specifically applied to the game of golf, at each tee, initialized parameters of range and direction of hole are input to a dedicated microprocessor. Thereafter, even though travel from the tee to hole occurs along a random path (typically a level as possible route following the random direction to which golf balls can be hit by one or two cart riders) a continuous read-out of range to the hole is provided. This continuous read-out is provided by an essentially continuous integration of the direction of travel, as provided by the radius of curvature of the path as well as the path length. Provision is made for either the manual or memory entry of the initial hole parameters of flag direction and range. Provision is made for displaying length of drive from the tee. Specific embodiments include adaptation of the invention to a self-propelled cart having at least three wheels or to a simplified cart having paired co-axial wheels separated by a fixed distance capable of toting only a golf bag.

OTHER OBJECTS, FEATURES AND ADVANTAGES

An object of this invention is to disclose a cart mounted device for reading out at all times the range to the hole along a randomly circuitous path commenced at the tee. Two wheels are monitored as to distance traveled and radius of curvature. A microprocessor is initialized with inputs of range and direction from the tee to the hole. By continously integrating the change of range and the angle to the hole, a readout in range to the hole only can be displayed continuously.

An advantage of the provided ranging device is that a continuous estimate of range to the hole is always provided at the cart. By simple reference to the cart, a player can make an estimate of the range to the hole.

A further advantage of this invention is that maps are not required. Maps do not have to be purchased, or referred to.

Yet another advantage of this invention is that it is operative even though the hole is out of sight. Optical line of sight from the tee to the hole is not required.

Yet an additional advantage of this invention is that continuous inputs of direction—such as the direction of true or magnetic North—is not required. Instead, monitoring of the distance that the cart travels as well as the radius of curvature of the cart at closely spaced discrete intervals of travel is all that is required.

A further object of this invention is to disclose an embodiment in which range and direction can be entered in a processor memory for access as the game of golf is played. According to this aspect, the microprocessor is preloaded with range and direction information. The golf cart in the vicinity of the tee is initially positioned in a fixed direction. For example, the cart path adjacent the tee is provided with a line to which the golf cart is positioned in parallel. A memory mounted in the microprocessor on the golf cart recalls from a previously loaded memory both range (tee to hole) and direction (relative to path marked line). By indexing in available memory sequential direction and range values for sequential holes, remote indication of distance of a golf cart from a tee can be provided at all times.

An advantage of this aspect of the invention is that golf carts can be "customized" to the parameters of any existing golf course. For example, a memory can be equipped with the parameters of any existing golf course. Thereafter, the distance traveled and radius of curvature sensors can be attached to some or all of the golf carts of a particular fleet of carts utilized at the golf course. By simply aligning the golf cart at each tee and indicating the start of the trip to the hole, a continuous indication of the range to the hole can be provided.

A further object of this invention is to disclose an apparatus for mounting to a self-propelled cart. According to this aspect of the invention, a device for measuring the radius of curvature of the cart is attached to the steering linkage. A distance traveled measuring device—such as an odometer—is attached to typically driving wheels. By nearly continuous integration of these outputs, a reading of the distance to hole is always available.

A further object of this invention is to disclose an alternate embodiment of this invention which can be mounted to a two-wheel golf cart, such as that used to haul bags around the golf course. According to this aspect of the invention, the paired wheels of the golf cart are adjusted to a fixed distance apart. Revolution counters reading to a small fraction of a turn are attached to each wheel. By integrating with the simultaneous rotation of the wheels for distance traveled and the differential rotation of the wheels one with respect to another for radius of curvature, the change of range to a target, such as a golf hole can be known.

Other objects, features and advantages of this invention will be more apparent after referring to the following specification and attached drawings in which:

FIG. 1A is a schematic of the first hole of a golf course illustrating a golf cart aligned to the cart path adjacent the tee, a golfer hitting a ball and a typical random path along which a ball is hit in three strokes from tee to green;

FIG. 1B is an illustration of the control box housing the microprocessor of this device;

FIG. 2A is an illustration of the driving and steering wheels of a golf cart illustrating take-off points for radius of curvature and distance traveled;

FIG. 2B is an enlargement of the radius of curvature measuring device;

FIG. 2C is an enlargement of a preferred embodiment of the distance traveled apparatus;

FIG. 3 is a sketch helpful in understanding the angle to which the steering mechanism of the cart is turned;

FIG. 4 is an illustration of the radius of curvature of a cart having forward steering and after driving wheels;

FIG. 5 is an overall trigonometric diagram of the cart problem;

FIG. 6 is a local trigonometric diagram illustrating how the nearly continuous integration of the distance to the green is made;

FIG. 7 is an alternate diagram illustrating how through a law of cosines computation, the length of a golfer's drive may be accurately measured;

FIG. 8 is an illustration of a golf cart of the two-wheeled hand-pulled variety illustrating the apparatus of this invention attached thereto;

FIG. 9 is a simplified block diagram of my invention; and

FIG. 10 is a simplified flow chart showing the operation of my invention.

DETAILED DESCRIPTION OF THE PREFERRED EMBODIMENT

Referring to FIG. 1A, a golf cart K is shown in part adjacent a tee 10 having a golfer 14 standing thereon. The golfer strikes a golf ball along a path A, B and C to a green G at a hole H at some distance away. A second golfer strikes a ball along a path A', B', and C' along a second path. As is common practice, both golfers use the same cart K. FIG. 9 shows the present invention in block diagram form. A control box 17 is shown at FIG. 1B having a display 18 and a number of buttons for activating the microprocessor 100 of the invention. The display typically indicates the hole number and the distance from the green.

Typically upon arrival at the tee, the golf cart is aligned to a linear marker or line 16. Any time after the cart is parked in its standard position at line 16, and facing in its standard direction (which may or may not be in the direction of the next hole), the driver can press a button labeled "Hole". This will indicate the hole number, generally commencing with Hole 1 (at turn on) to 2, at the second tee. If the golfers are playing a par 3 hole (usually 4 to a standard 18-hole course), they may or may not wish to use the computer. For example, if they decide to use it at hole 11, at the next teeing area they will press "Hole" twice and the hole indicator on the display will cycle from 10 to 11 to 12.

Returning to the golfers of FIG. 1A, after they have driven their balls, the cart is driven to the first of the 2 balls, in this case the ball at A'. It will be parked at the same distance from the green, and generally a few feet to the golfer's right. The golfer can then read the distance to the center of the green from the display.

If desired, a button labeled "Drive" can be provided so that when pushed, the length of the golfer's drive, from the standard marker on the teeing area, is displayed. This will work even on a dogleg hole; when Drive is pressed, the drive length is shown, but when it is released, the distance from the ball to the green is again shown. (See FIG. 1B)

In order to have the device of this invention operative, two outputs from the golf cart are required. The first of these is the radius of curvature. The second is the distance traveled. FIGS. 2A, 2B and 2C illustrate the removably attachable apparatus which can be affixed to a golf cart for determining these outputs.

Referring briefly to FIG. 3, the geometry of the steering bar 19 is shown. The levers connecting the front axles to the steering bar have a length L, so the wheel deflection angle B is given by $\sin B = x/L$.

FIG. 4 shows that the curvature of the path $\smile$ (defined as $1/r$, where r is the radius of curvature of the turn). Since $\sin B = D/r$, the curvature $\smile$ is given by the equation $\smile = 1/r = x/DL = kx$, where k is a constant of the cart. (D is the wheel base.)

Since we will want to use $1/r$ in later calculations, it is convenient that it is simply proportional to the left to right motion of the steering bar: $1/r = kx$. (My invention will be that when the center of curvature is to the right of the car, the radius and the curvature are both positive.)

Referring to FIG. 2A, installation of the respective take-offs of wheel angle and distance traveled can be understood. referring to FIG. 2A, the four wheels of a conventional golf cart are schematically illustrated. Rear wheel 21 is the wheel to which the distance measuring apparatus is applied. Steering wheels 22, 23 are the wheels from which the radius of curvature of the cart is continuously read out. As should be apparent to those having ordinary skill in the art, a take-off of the particular radius of curvature to which the cart is set can be provided at any place along the steering linkage.

An example of how such a take-off is attained is illustrated in FIG. 2B. In FIG. 2B, steering lever 25 has attached a piano wire 26. Wire 26 passes interiorly of a brass tube 27. Tube 27 terminates in the vicinity of a potentiometer 30 and has its concentrically threaded wire 26 connected to a rack 32. Rack 32 actuates rotation of a potentiometer at gear 35 dependent upon the displacement of the wheels 22,23.

The potentiometer is provided with three leads, leads 40, 42 having a voltage applied thereacross and lead 41 reading the particular voltage to which gear 35 positions the potentiometer along its path of travel. As is well known, the voltage readout of the potentiometer is directly proportional to the position of the wiper arm in the potentiometer. Consequently, the voltage difference between terminal 41 on one hand and either of the terminals 40, 42 on the other hand is a direct indication of the radius of curvature of the steering wheels 22, 23.

Referring to FIG. 2C, apparatus for measurement of cart travel is illustrated. A driving rear wheel 21 is illustrated. Registered to the rear wheel is a distance measuring wheel 51. Wheel 52 is sprung from the golf cart chassis 54 by any suitable apparatus. Distance measuring wheel 51 has a magnet 52 attached to the periphery. A microswitch 55 counts the number of revolutions of wheel 51. By using measuring wheel 51, accurate distances can be determined regardless of the diameter of the golf cart rear wheels.

Setting forth parameters read from the golf cart, attention can now be directed to how these parameters taken from the golf cart are used.

It will be observed that the only direction input needed is that from the cartpath line 16 (alongside the teeing area) to the center of the corresponding green. Further, and as compared to prior art DRT's, accuracy requirements are reduced for two reasons. First, the dead reckoner is reset every four or five hundred yards, i.e. after each hole. Secondly, information better than three or four yards is not usable since (a), golfers do not know the precise position of the hole with respect to the center of the green, and (b), it is not possible for even the greatest golfer to make use of such accurate information, even if it were available. Consequently on a 500 yard par 5 hole, the maximum distance which the user will want to integrate is about 400 yards—within about 100 yards of the green the golfer will be able to estimate his distance well enough so that he will not need the computer. So the typical measured path of interest is 300±100 yards. If we measure that to 1%, we have the answer we want good to 3±1 yards.

A radial coordinate system using R, $\theta$, with its temporary center at the center of each green, will be used. This matches the problem better than the usual cartesian coordinates, because R, which is one of the two principal coordinates, is that displayed as the distance to the hole. Although $\theta$ is not of interest to the golfer, it must be kept track of at all times. Any R, $\theta$ system must have a "local north", from which the angle $\theta$ is measured. In my coordinate system that direction is parallel to line 16 near the distance marker on the teeing area. The cart will be considered to face "local south" at that time.

When the computer is initialized (at each new tee, step 200 in FIG. 10), the $\alpha$ register is set to O, and $R_o$, and $\theta_o \phi_o$ are set into the R, $\theta$ and $\phi$ registers (step 201 in FIG. 10). These values are typically automatically entered into the registers from pre-programmed values in the memory for that particular golf course and hole number. As the cart moves (step 202 in FIG. 10), e.g. after each full turn of the direct measure wheel, the computer goes through the following set of 4 equations.

$$R = R - \Delta s \cos \phi \quad (1)$$

$$O = O + \Delta s (\sin \phi)/R \quad (2)$$

$$\alpha = \alpha + kx \Delta s \quad (3)$$

$$\phi = \alpha + \theta \quad (4)$$

This updates the values, $R_p$; $\theta_p$; $\phi_p$ and $\alpha_p$; to the new values, $R_q$; $\theta_q$; $\phi_q$; and $\alpha_q$. (Mathematically, this is substituting a finite sum for an integral, and it is more than accurate enough.)

For the purpose of illustration, the circumference of the measuring wheel is taken to be 0.50 yard, its diameter would be $18''/\pi = 5.73''$. The accuracy of the measurements (step 203 in FIG. 10) will increase as the diameter of measuring wheel 51, and thus $\Delta s$, is made smaller. Assuming the cart is at the point $R_q$; $\theta_q$; and its four registers (R, $\theta$, $\phi$, and $\alpha$) have the data appropriate to the point $R_p$; $\theta_p$; which is 0.50 yard back along the track, the operation of the device can be understood. As the measuring wheel is kept pressed against the rear golf cart wheel, it will rotate once when the cart has moved 0.50 yards. This diameter is small enough that it could fit into the space typically available. But any reasonable diameter can be used; the smaller it is, the more frequently the calculations must be made, because a small wheel turns more rapidly. If we assume that the cart has a top speed of 30 mi/hr, which is 44 ft/sec and we go through the calculations every 1.5 feet, there will be about 30 calculations per second, or 33 milliseconds available for each calculation. That is much more time than is needed by the computer to perform the calculations. The following discussion will be based upon the assumption that every time the measuring wheel completes one rotation, the set of calculations—shown below and at step 204 in FIG. 10—will be initiated.

First, the variables will be defined.

Referring to FIG. 5, the coordinate system is a radial system, with

R = distance from center of green to cart;

$\theta$ = angle between the radius vector to the cart and "local north" which is the original front to back axis of the cart, at the corresponding teeing area. $\theta$ increases counterclockwise.

$\alpha$ = angle between cart axis (or direction of motion) and "local south". $\alpha$ increases clockwise.

$\phi$ = "angle off the bow", of the green center relative to cart axis. $\phi$ is negative to the right and increases counterclockwise.

$$\phi = \alpha + \theta (\phi_o = \theta_o; \alpha_o = 0)$$

s = distance traveled along the path of the golf cart.

s = p$\Delta$s, where $\Delta$s is the "integration interval", between calculations (assumed to be 0.50 yards in the discussion above), and s is the distance along the path, measured in half yards (or more generally, in units of $\Delta$s, whatever it is). So p is the number of calculation cycles that have been made to calculate the 4 values stored in the four registers, $R_p$; $\theta_p$; $\phi_p$; and $\alpha_p$. In another movement of the cart by 0.50 yards along the path, the next values, $R_q$; $\theta_q$; $\phi_q$; and $\alpha_q$ will be calculated and stored in the four registers, in place of the previous values.

$\Delta\alpha = \Delta s/r$, where r is negative when the cart turns to the left ($\Delta s$ is positive when the cart is moving forward).

$\Delta\alpha$ is the increase in $\alpha$ due to the fact that the cart has moved a distance $\Delta s$ along a circle with a radius of r. $1/r = kx$, as explained above.

INITIAL CONDITIONS $R_o$ is stored in the R register 101 (FIG. 9), from the memory, before leaving the teeing area.

$\theta_o$ is stored the same way in register 102 (FIG. 9).

$\phi_o$ is stored as equal to $\theta_o$, the same way.

$\alpha_o$ is stored equal to zero, by definition, the same way.

Referring to FIG. 6, I will now expand the area near the upper lefthand corner of FIG. 3, to show how we go from point p ($R_p$ and $\theta_p$) to point q ($R_q$ and $\theta_q$).

In the right triangle opq, pq=$\Delta s$, which is the distance traversed between reevaluations of the four variables, R, $\theta$, $\phi$, and $\alpha$. op is the change in R, from q to p, and it is seen to be negative, since $R_q$ is less than $R_p$, by an amount $\Delta R$=op. (For normal motions of the cart, $\Delta R$ will be negative, since the object of the game is to get closer to the green, which is the center of the coordinate system.) op=$(\Delta s)$ cos $\phi$.

the change in $\theta$, from $\theta_p$ to $\theta_q$ is $\Delta\theta$, which is equal to oq/R=$\Delta s$ (sin $\phi$)/R.

The first equation we'll evaluate is $$\theta_q = \theta_p + \Delta s (\sin \phi)/R,$$

In tracing the following example, it will be understood that the computer language referred to is that language utilized by the Hewlett-Packard Company of Corvalis, Oreg. and common to handheld calculators such as the HP19C, HP97, HP67 or HP41C. The algorithm by which the invention operates is set forth in detail in the following example, and in simplified form in FIG. 10.

In computer language, $$\theta = \theta + \Delta s (\sin \phi)/R,$$

or in HP calculator language, if $\theta$ is stored in register 2, we evaluate "$\Delta s$ (sin $\phi$)/R", and execute the command "Store +2". That puts $\theta_q$ in place of $\theta_p$.

We next perform the operation $R_q = R_p - (\Delta s)$ cos $\phi$, or $R = R - (\Delta s)$ cos $\phi$, or in HP calculator language, with R stored in 1, we evaluate $(\Delta s)$ cos $\phi$, and then execute "store −1". If $\Delta s$ is stored in 5, and $\phi$ is stored in 3, we find $(\Delta s)$ cos $\phi$ by performing the operations: Recall 3, f cosine, Recall 5 x, and then we say "Store −1".

We now need to update $\theta$ and $\alpha$. Returning to HP calculator language, first we calculate $\Delta\alpha = \Delta s/r$, where 1/r = kx. So $\Delta\alpha = kx\Delta s$. k and $\Delta s$ are stored in registers 6 and 5, respectively, and x is stored in register 7. After calculating $\Delta\alpha$ by the operations: Recall 5, Recall 6, Recall 7, Times, Times, we execute "Store +4", because is stored in register 4 (which was set=0 in the teeing area.) We now can update $\phi$, which is equal to $\alpha + \theta$. So we key: Recall 4, Recall 2, +, Store 3. This completes the cycle of calculations. (Note that register 3 is the only one of the four main registers in which we do not "register arithmetic". We replace the old value of $\phi$ with the newly calculated value of $\phi$, instead of adding or subtracting a calculated value from something already in the registers—as we do in registers 1, 2, and 4.)

To recapitulate, the typical HP storage registers are

| Register | Variable stored |
| --- | --- |
| 1 | R |
| 2 | $\theta$ |
| 3 | $\phi$ |
| 4 | $\alpha$ |
| 5 | $\Delta s$ |
| 6 | k |
| 7 | x |

The equations are (with all angles in radians):

$$R = R - \Delta s \cos \phi \quad (1)$$

$$\theta = \theta + \Delta s (\sin \phi)/R \quad (2)$$

$$\alpha = \alpha + kx\Delta s \quad (3)$$

$$\phi = \alpha + \theta \quad (4)$$

We calculate $\phi$ after calculating $\alpha$, because $\alpha$ is independent of $\phi$, and depends only on the previous value of $\alpha$, plus the turning radius, whereas $\phi_q$ depends on both $\alpha_q$ and $\theta_q$. If we calculated $\phi_q$ before $\alpha_q$, we would end up with a value of $\phi_q$ that depended on $\alpha_p$ and $\theta_q$. By reversing the expected order of calculating $\alpha$ and $\phi$, we clean things up a bit, by having $\phi_q$ depend on $\alpha_q$ and $\theta_q$. But in practice, the difference would be slight.

So that is all the mathematics we need to do the main job of displaying R—the distance from the cart to the green (step 205 in FIG. 10). If we want to let the golfers see how far their drives went (which can be quite gratifying for golfers), the computer must remember $R_o$ and $\theta_o$. We can do this by storing them in registers 8 and 9, when they are originally put in registers 1 and 2. (Registers 1 and 2 will not retain the original values, $R_o$ and $\theta_o$, because those registers hold the changing values of R and $\theta$.)

We can now find the length of the drive, from the "cosine law", for a triangle of sides $R_o$ and $R_q$. FIG. 7 shows the geometry.

In the triangle qgo, we know sides $R_o$ and $R_q$, and their included angle is $\theta_q - \Theta_o$. We then calculate $$\text{Drive Length} = D = \sqrt{R_q^2 + R_o^2 - 2R_qR_o\cos(\theta_q - \theta_o)}$$

All of these quantities are available from their appropriate registers, so when the golfer holds down the D button, the computer evaluates D, and displays it in place of the cart-to-green distance R.

That finishes the exemplary calculations.

It will be noted that operation is not dependent upon wheel diameter of the golf cart being accurately measured. Such accurate measurement is a problem one has with an ordinary odometer, where one counts revolutions of the car wheel, and converts that measurement into a "distance traveled". But in the method adopted here, where a "measuring wheel" is pressed against the golf cart wheel, that constant diameter is not a problem. For example, if the diameter of the cart tire is doubled, the measuring wheel would still rotate once for every 0.50 yard of cart travel.

A few minor matters will now be covered. We do not need values of sin or cos that are better than 3 significant figures, so the computation required to evaluate those two functions is simplified. We can also make good use of a read-only memory, with many stored values of sine and cosine, plus a simple interpolation routine. So the typical Hewlett-Packard algorithm to calculate sine or cosine—which takes about 1 second to give those functions to 10 significant figures—is not needed. In this way, there is sufficient time, using a microprocessor, to evaluate the set of 4 equations in the 33 milliseconds available.

If we automatically reverse the sign of the Δs stored in register 5, whenever we put the cart into reverse, R will still be correctly calculated at all times.

Referring to FIG. 1A, a button labeled "150 yards" is shown. Most courses have small trees planted 150 yards from the center of each green. These markers can be used to re-initialize the computer at 150 yards with the cart facing the center of the green. The golfers can drive down the middle of the fairway (toward the green) and when they are opposite the 150 yard tree, they can push the 150 yard button. That will set 150 into the R register, and $\theta_o = \phi_o = \alpha = 0$ into the three angle registers. From then on, they will get even more accuracy in the yards display than they would have from a setting of the registers at the tee. Further, it may be desired to reinitialize it for some reason, for example if the players forgot to initialize at the tee or if they had to back up, assuming that for economic reasons, the builder of the dead reckoner decided it was not worthwhile to sense the direction of motion of the cart, when it was reversed.

It will be noted with this feature of the invention, recordation of memories with range to the hole recorded is not always required. Thus, a cart not programmed with the data for a particular course can still be used. This is so because if the average golfer is 200 yards or more from the hole, as he or she can guess by looking ahead to the 150 yard tree, he will use "all the club he has", such as a 3 wood. In other words, he does not need to know the actual distance; he knows he cannot reach the green in one shot. If between 150 and 200 yards away, he will have to drive up to the 150 yard tree, set his computer, and drive back to his ball to get the proper indicator.

So with this button available, any golf cart equipped with the dead reckoner can be used on any course. If it is used only on its home course, as most carts are, its very small read-only memory (ROM) will have stored in it only 36 numbers—the 18 $R_o$'s and the corresponding 18 $\theta_o$'s. So it will be a simple and cheap operation to program the memories for a fleet of carts at any particular golf course. If desired a somewhat more complex control box could be provided so that the distance to the center of the green could be keyed in at each hole. The angular settings could be provided by the course or the golfer could align the cart with the green and input 0° as the initial values for $\theta$ and $\phi$.

It will be appreciated that the particular apparatus illustrated in FIGS. 2A,-2C, 3 and 4 for measuring the radius of curvature of the golf cart having four wheels, could be altered. For example, the apparatus of this invention can be just as well applied to a three-wheeled golf cart wherein at least one wheel steers. The invention could also be adapted to a two-wheeled golf bag caddy. In that case the mathematics would be different because the direction of travel would not be determined by a steerable wheel (as in the present embodiment) but would be determined by the difference in distance that the two wheels travel.

Referring to FIG. 8, a golf cart is illustrated with portions of a driving wheel broken away. The wheel has a magnetized disc 300 attached to the inside thereof, this wheel being about three inches in diameter. Attached to the cart there is a magnetic "head" 301 that senses the passage of each of the magnetized sections. These magnetized sections are approximately 100 in number.

In the vicinity of the handle there is placed a console. This console includes two counters. One counter counts magnetized sections on the left wheel and the other counts magnetized sections on the right wheel and subtracts them from the left wheel count. It can be seen that one magnetized section equals 1% of the circumference. So if the circumference $= C = \pi D \approx 1$ yard, each tic is 0.01 yard. Count m tics from the left wheel, and go through the calculation of new values of R and $\theta$. (m can be 32, or some other power of 2.)

We must calculate the angle the instantaneous cart direction makes with "local south". If the "difference counter" reads 0, the cart direction is of course local south, so $\alpha = 0$.

If the distance between the wheels is W, and the right wheel is locked, the angle $\alpha$ (in radians) is the circumferential distance the left wheel has moved, divided by W. At any time, $\alpha$ is the extra distance the left wheel has moved, compared to the right wheel. The "difference counter" therefore always displays a number proportional to $\alpha$. I'll now calculate the constant that relates $\Delta m$—the differential count—to $\alpha$.

Since $C = \pi D$, and there are 100 counts per turn, the distance one wheel goes per count is $\pi D/100 = d$. The angle $\alpha$, accumulated per differential count is therefore: $\alpha = d/W = \pi D/100W$. This is the angle in radians. So $\alpha = \pi D \Delta m / 100 W$.

Instead of accumulating $\alpha$, by adding $\Delta \alpha$ to the stored in register 4, we substitute the new value of $\alpha$ ($\alpha = \pi D \Delta m / 100 W$) for the old one stored in 4. All subsequent operations are as previously indicated.

$\Delta s$ is the distance the left wheel goes between integrations, which may be any easily evaluated distance, such as $\Delta s = 32 \pi D / 100$, which is close to the diameter of the wheel, which is of the order of 1 foot.

It will be noted that by adding counts from the left wheel, and subtracting them from the right, we derive a value of $\alpha$ that increases clockwise, as our conventions demand. $\Delta m$ is a number plus a sign, so $\alpha$ has the proper algebraic behavior.

What is claimed is:

1. In a golf cart having at least three wheels for movement and having a steering linkage coupled to at least one of said wheels to steer said cart along a randomly circuitous path between a first point and a second point, an apparatus for indicating the range from said cart on said randomly circuitous path to said second point when distance and direction from said first point to said second point are known, comprising:

means coupled to at least one of said wheels for measuring, and for providing an output indicative of, distance traveled by said cart between said first point and said second point along said randomly circuitous path;

means coupled to said steering linkage for providing an output indicative of change of cart direction per unit of path length traveled by said cart with respect to the cart's bearing to said second point as it is steered along said randomly circuitous path;

a processor having a first input connected to the output of said distance measuring means, having a second input connected to the output of said change of direction indicating means, and including a first register for storing the distance from said first point to said second point when said cart is at said first point, and including a second register for storing the direction from the first point to the second point when the cart is at said first point, said processor providing an output indicative of the range from said cart on said randomly circuitous path to said second point; and means having an input connected to the output of said processor for displaying the range from said cart on said randomly circuitous path to said second point.

2. The apparatus of claim 1, wherein said distance measuring means further comprises a measuring wheel rotatably engaged with a wheel of said cart.

3. The apparatus of claim 2, wherein said distance measuring means further comprises means coupled to said measuring wheel for counting said measuring wheel rotations.

4. The apparatus of claim 1, wherein said processor further comprises an electrical computer electrically coupled to said distance measuring means and said change of direction indicating means.

5. The apparatus of claim 4, wherein said electrical computer further comprises means responsive to an apparatus user when said cart is at said first point for automatically storing the distance and direction from said first point to said second point to initialize said electrical computer.

6. The apparatus of claim 5, wherein said displaying means further comprises an electric numeric display electrically coupled to said computer.

* * * * *